(12) United States Patent
Huang

(10) Patent No.: US 12,440,297 B2
(45) Date of Patent: Oct. 14, 2025

(54) ENDOSCOPE ADAPTER AND AUXILIARY INSTRUMENT FOR ENDOSCOPIC SURGERY

(71) Applicant: SHENZHEN ROBO MEDICAL TECHNOLOGY CO., LTD., Shenzhen (CN)

(72) Inventor: Jian Huang, Shenzhen (CN)

(73) Assignee: SHENZHEN ROBO MEDICAL TECHNOLOGY CO., LTD., Shenzhen (CN)

( * ) Notice: Subject to any disclaimer, the term of this patent is extended or adjusted under 35 U.S.C. 154(b) by 452 days.

(21) Appl. No.: 17/986,898

(22) Filed: Nov. 15, 2022

(65) Prior Publication Data
US 2023/0355337 A1    Nov. 9, 2023

(30) Foreign Application Priority Data
May 6, 2022 (CN) .......................... 202210489369.8

(51) Int. Cl.
*A61B 34/00* (2016.01)
*A61B 34/30* (2016.01)

(52) U.S. Cl.
CPC .............. *A61B 34/71* (2016.02); *A61B 34/30* (2016.02); *A61B 2034/301* (2016.02)

(58) Field of Classification Search
CPC .... A61B 34/71; A61B 34/30; A61B 2034/301
See application file for complete search history.

(56) References Cited

U.S. PATENT DOCUMENTS

| 8,088,062 B2 * | 1/2012 | Zwolinski | A61B 1/018 606/205 |
| 2010/0125164 A1 * | 5/2010 | LaBombard | A61B 1/0014 600/101 |
| 2022/0054114 A1 | 2/2022 | Brakhya et al. | |

FOREIGN PATENT DOCUMENTS

CN          110916598 A        3/2020

OTHER PUBLICATIONS

First notice of examination opinions of CN202210489369.8 of Oct. 11, 2024.

* cited by examiner

*Primary Examiner* — Mohamed G Gabr
*Assistant Examiner* — Khoa Tan Le

(57) ABSTRACT

The present disclosure discloses an endoscope adapter and an auxiliary instrument for endoscopic surgery. The endoscope adapter includes an inner sleeve and an outer sleeve. The inner sleeve includes an inner channel configured for accommodating a distal end of an insertion portion of the endoscope. The outer sleeve is sleeved on the inner sleeve, and capable of defining an outer channel between the outer sleeve and the inner sleeve, and the outer channel is configured for accommodating and providing a space for pushing and drawing a robot arm assembly having an end effector.

11 Claims, 14 Drawing Sheets

ENDOSCOPE ADAPTER AND AUXILIARY INSTRUMENT FOR ENDOSCOPIC SURGERY

CROSS-REFERENCE TO RELATED APPLICATIONS

This application claims all benefits accruing from China Patent Application Nos. 202210489369.8, filed on May 6, 2022, in the China National Intellectual Property Administration, the content of which is hereby incorporated by reference.

TECHNICAL FIELD

The present disclosure relates to an endoscope adapter matched with a flexible endoscope and an auxiliary instrument for endoscopic surgery.

BACKGROUND

Endoscopic surgery is a technique that applies endoscopes (including flexible endoscopes and rigid endoscopes) which can be delivered into a human cavity tract for examination and treatment under visualization. Endoscopic surgery in the gastrointestinal tract is usually performed with a flexible endoscope, which can reduce the pains in patients because no incision is needed on the skin.

Malignant tumors of the digestive tract (including gastric cancer, esophageal cancer, and colon cancer) are at the forefront in terms of morbidity and mortality, and early diagnosis and treatment can effectively improve survival rates. Currently, minimally invasive treatments such as Endoscopic Submucosal Dissection (ESD) have become standard treatments for early-stage tumors of the digestive tract. Early-stage tumors of the digestive tract can be completely removed under endoscopes at one time by method of ESD, so that patients can be free from pains of laparotomy and removal of organs.

As a mainstream treatment method for superficial lesions of the digestive tract, ESD has advantages of less trauma, quick recovery, and low cost, but it is essentially a complex technique that requires an endoscope to operate. Most of common flexible endoscopes are single-channel endoscopes, that is, endoscopes including only one channel for surgical instruments. Therefore, a mucosal dissection surface of the digestive tract cannot be effectively exposed due to lack of corresponding fit during a surgical operation, resulting in unclear surgical field of vision. Therefore, ESD is still a relatively difficult operation for most endoscopic physicians, and is prone to serious complications such as bleeding and perforations.

It is well known that a good surgical field is critical to reduce complications. In this regard, worldwide endoscopic physicians have made a lot of attempts and studies to improve operability and safety of endoscopes. For example, methods for increasing mucosal traction, such as a clip and tract—with titanium line method and an external magnetic anchoring method, have been developed. These methods can enhance the surgical field of the mucosal dissection surface, but specially designed endoscopes are required in the methods. At the same time, these methods have disadvantages such as inability to adjust strengths and directions of the mucosal traction, and gradual disappearance of the mucosal traction with a progress of the surgical operation.

SUMMARY

The present disclosure provides an endoscope adapter, which can provide an outer channel for a flexible endoscope.

The present disclosure provides an auxiliary instrument for endoscopic surgery, which can provide assistance for endoscopic surgery, help to improve accuracy and stability of a surgical operation, reduce operation difficulty and shorten operation time thereof.

In some embodiments, the present disclosure provides an endoscope adapter. The endoscope adapter includes an inner sleeve and an outer sleeve. The inner sleeve includes an inner channel configured for accommodating a distal end of an insertion portion of the endoscope. The outer sleeve is sleeved on the inner sleeve, wherein an outer channel is defined between the outer sleeve and the inner sleeve, and the outer channel is configured for accommodating and providing a space for allowing a robot arm assembly having an end effector to advance and retract.

In some embodiments, the outer sleeve comprises an outer sleeve body and a separator extending inwards from an inner sidewall of the outer sleeve to the inner sleeve, the outer channel is located in the separator and extends through the separator, and the separator is configured to limit the inner sleeve and the outer channel.

In some embodiments, an upper surface of the separator recesses downwards from an end surface of the outer sleeve body.

In some embodiments, the inner sleeve is made of a flexible material, and an inner diameter of the inner sleeve is slightly smaller than an outer diameter of the distal end of the insertion portion of the endoscope.

In some embodiments, the inner sleeve includes an inner sleeve body including the inner channel, an outer sidewall of the inner sleeve body comprises a pair of first limiting members extending outwards therefrom. When the outer sleeve is sleeved on the inner sleeve body, the pair of first limiting members is capable of limiting two axial ends of the outer sleeve.

In some embodiments, the inner sleeve includes an inner sleeve body including the inner channel, an outer sidewall of the inner sleeve body includes at least one second limiting member extending outwards therefrom. The outer sleeve is provided with a groove matching with the second limiting member. When the outer sleeve is sleeved on the inner sleeve body, the second limiting member is inserted in the groove.

In some embodiments, the inner sleeve includes an inner sleeve body including the inner channel. An inner sidewall of the inner sleeve body comprises a limiting ring protruding inwards therefrom, which is configured for preventing the distal end of the insertion portion of the endoscope from penetrating through the inner sleeve.

In some embodiments of the present disclosure, an auxiliary instrument for endoscopic surgery is further provided. The auxiliary instrument for endoscopic surgery includes any one of the above-mentioned endoscope adapters, a manipulator, a sheath having a sheath lumen and a robot arm component. The endoscope adapter is configured to be connected with the distal end of the insertion portion of the endoscope. The sheath is configured to form a communicating channel between the outer channel of the endoscope adapter and the manipulator. The robot arm component includes the end effector, an elastic tube, a first actuation wire and at least two second actuation wires. The elastic tube extends through the communicating channel, a distal end of the elastic tube extends out from the sheath lumen, and a proximal end of the elastic tube is manipulatively connected to the manipulator. The first actuation wire is configured to penetrate through the elastic tube, a distal end of the first actuation wire is connected to the end effector, and a proximal end of the first actuation wire is manipulatively connected to the manipulator. The at least two second actuation wires are configured to penetrate through the sheath lumen and disposed outside the elastic tube, and a distal end of the second actuation wire is connected to the distal end of the elastic tube. A proximal end of the second actuation wire is manipulatively connected to the manipulator, and is configured to drive the distal end of the elastic tube to deflect towards an axis of the inner sleeve of the endoscope adaptor.

In some embodiments, the communicating channel of the sheathing tube includes a third channel and at least two fourth channels, the third channel is configured for allowing the elastic tube to penetrate through, the at least two fourth channels are configured for allowing the second actuation wire to penetrate through. In some embodiments, and the at least two fourth channels and the third channel are disposed at intervals. The number of the at least two fourth channels are the same with that of the at least two second actuation wires In some embodiments, the manipulator includes a first sliding block connected to the proximal end of the elastic tube, a second sliding block connected to the proximal end of the first actuation wire, a third sliding block connected to the proximal end of the second actuation wire and a chassis provided with guide rails. The first sliding block, the second sliding block and the third sliding block are capable of being driven to slide along a corresponding guide rail disposed on the chassis, respectively.

In some embodiments, the manipulator includes a first sliding block connected to the proximal end of the elastic tube, a second sliding block connected to the proximal end of the first actuation wire, a capstan connected to the proximal end of the second actuation wire and a chassis provided with guide rails. The first sliding block and the second sliding block are capable of being driven and sliding along a corresponding guide rail disposed on the chassis, respectively. The capstan is mounted to the chassis via an axle, and the capstan is capable of being driven to rotate around the axle.

In some embodiments, the end effector includes a four-bar linkage, a first linkage of the four-bar linkage is connected to a second linkage of the four-bar linkage via a first pivot pin, and a third linkage of the four-bar linkage is connected to a fourth linkage of the four-bar linkage via a second pivot pin. The distal end of the first actuation wire is connected to the second pivot pin, the distal end of the elastic tube is connected to the first pivot pin via a connecting seat, and both an end of the first rotating rod and an end of the second rotating are capable of extending to form a clamp.

Figure 1:
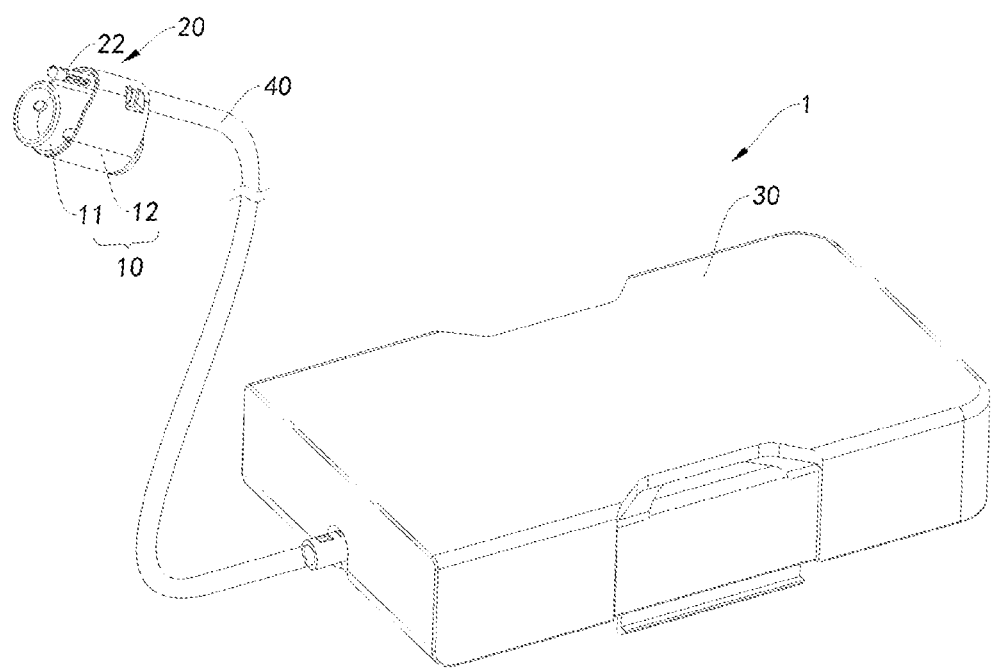
FIG. 1 is a stereoscopic diagram of an auxiliary instrument for endoscopic surgery in an embodiment of the present disclosure.

In the figures, 1 represents an auxiliary instrument for endoscopic surgery; 2 represents an endoscope, 10 represents an endoscope adapter; 11 represents an inner sleeve; 110 represents an inner channel; 111 represents an inner sleeve body; 112 represents a first limiting member; 113 represents a second limiting member; 114 represents a limiting ring; 115 represents a limiting groove; 12 represents an outer sleeve; 120 represents an outer channel; 121 represents an outer sleeve body; 1210 represents a transverse hole; 1211 represents a first head; 1212 represents a second head; 1213 represents a distal end surface; 1214 represents a groove; 122 represents a separator; 1220 represents an upper surface; 123 represents a fitting hole; 124 represents an accommodating slot; 20 represents a robot arm assembly; 21 represents a first actuation wire; 22 represents an end effector; 220 represents a clamp; 221 represents a first connecting rod; 222 represents a second connecting rod; 223 represents a third connecting rod; 224 represents a fourth connecting rod; 225 represents a first pivot pin; 226 represents a second pivot pin; 227 represents a connecting seat; 2271 represents a sleeve tube; 2272 represents a pivot arm; 23 represents an elastic tube; 231 represents a hard pipe section; 232 represents a bendable pipe section; 24 represents a second actuation wire; 30 represents a manipulator; 31 represents a first sliding block; 311 represents a first through hole; 312 represents a first protrusion; 313 represents a first channel; 314 represents a first fastening hole; 32 represents a second sliding block; 321 represents a second through hole; 322 represents a second protrusion; 323 represents a second channel; 324 represents a second fastening hole; 33 represents a third sliding block; 331 represents a third through hole; 332 represents a third protrusion; 333 represents a fixing hole; 34 represents a chassis; 340 represents a guide rail; 341 represents a guide rod; 342 represents a guide slot; 343 represents a connecting tube; 35 represents a capstan; 351 represents an axle; 40 represents a sheath; 400 represents a communicating channel; 410 represents a third channel; 420 represents a fourth channel; 50 represents a robot arm cart; 51 represents a master manipulator; and 52 represents a driving device.

DETAILED DESCRIPTION

It should be noted that embodiments and the features in the embodiments of the present disclosure can be combined with each other without conflict. The present disclosure will be described in detail below with reference to the accompanying drawings and in conjunction with the embodiments.

In the present disclosure, in the case of no explanation to the contrary, orientation words used such as "up, down, left, right" are usually for the direction shown in the drawings, or for the component itself in vertical, perpendicular or gravitational direction. Similarly, for the convenience of understanding and description, "inside and outside" refers to inside and outside of a contour of each component itself, but the above orientation words are not used to limit the present disclosure.

In the present disclosure, in the case of no explanation to the contrary, "distal end" indicates an end of a device away from an operator, and, "proximal end" indicates an end of a device near the operator.

Figure 4:
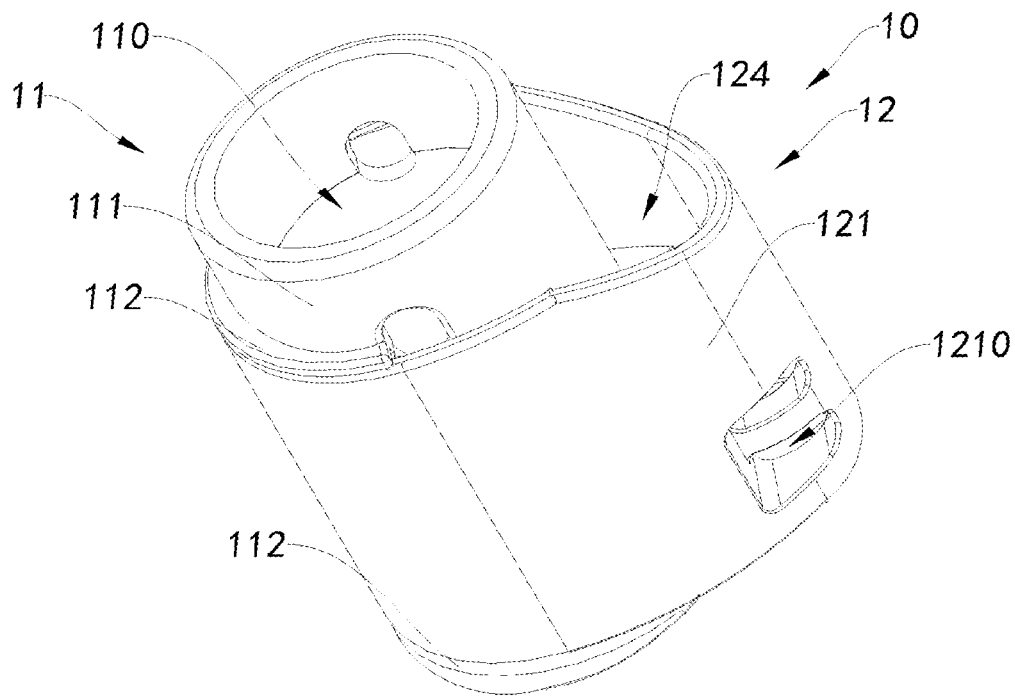
FIG. 4 to FIG. 6 are schematic views of an endoscope adapter in an embodiment of the present disclosure.
Figure 5:
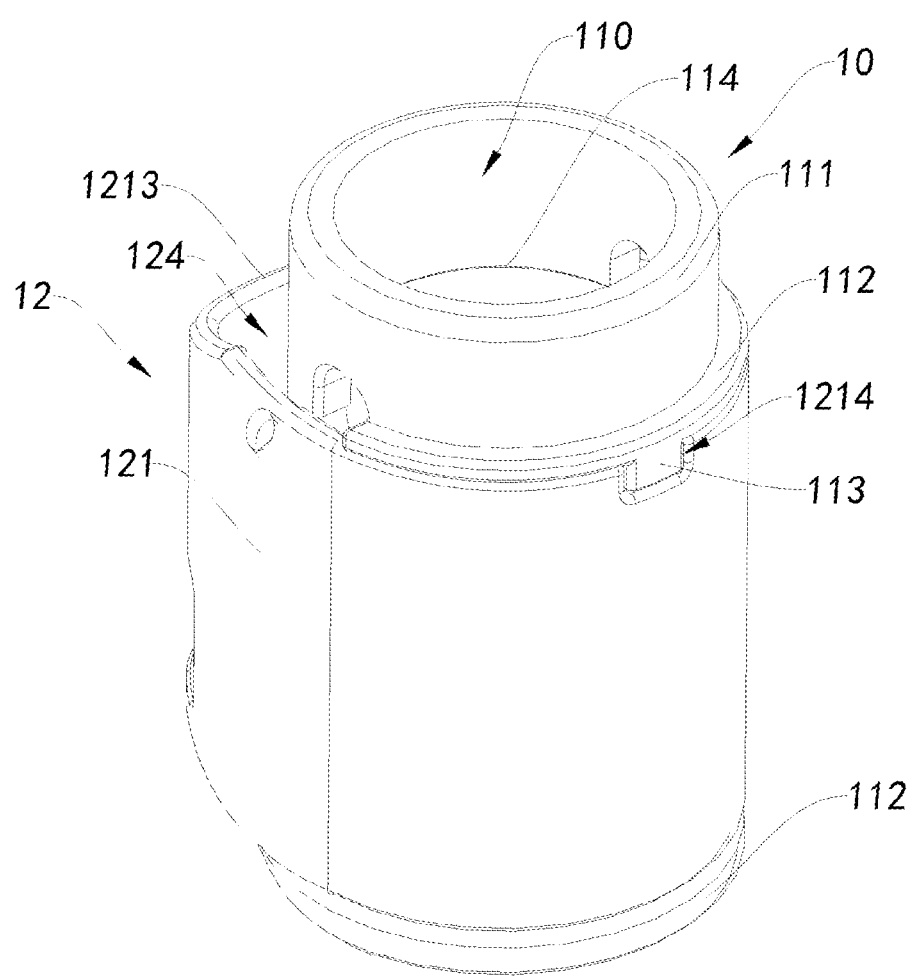
Figure 6:
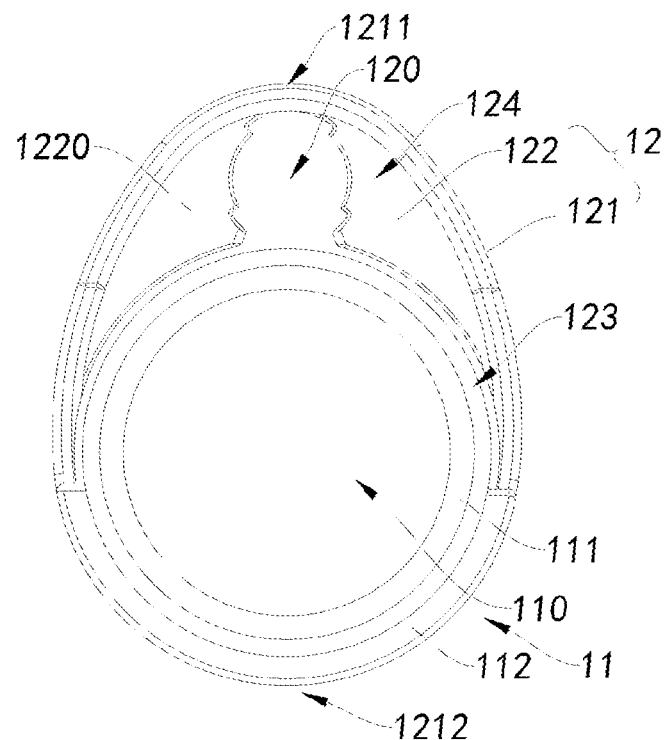

Referring to FIG. 4 to FIG. 6, the present disclosure provides an endoscope adapter 10 including an inner sleeve 11 and an outer sleeve 12. The inner sleeve 11 includes an inner channel 110 configured for accommodating a distal end of an insertion portion of the endoscope. The outer sleeve 12 is sleeved on the inner sleeve 11, and capable of defining an outer channel 120 between the outer sleeve 12 and the inner sleeve 11, and the outer channel 120 is configured for accommodating and providing a space for allowing a robot arm assembly 20 having an end effector 22 to advance and retract. In this way, in addition to an original working channel of a flexible endoscope, the endoscope adapter 10 can provide a reliable outer channel. The outer channel can allow the end effector 22 at a distal end of the robot arm assembly 20 to reach a desired position accompanied with the distal end of an insertion portion of the endoscope to, so as to provide assistance for performing a surgical operation.

Figure 8:
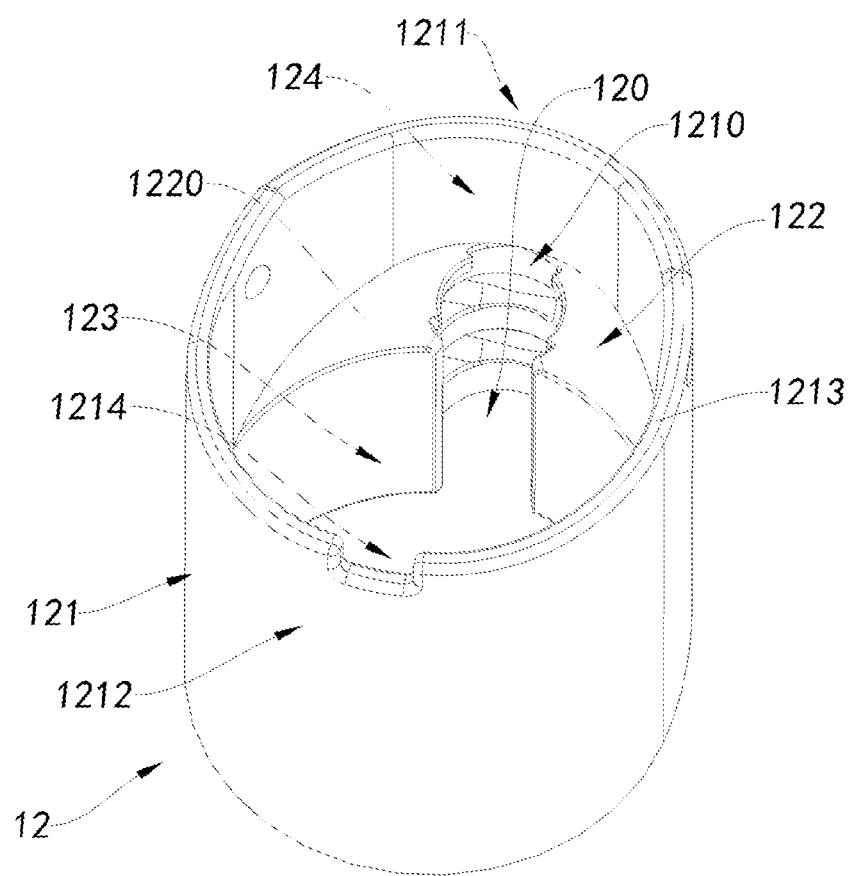
FIG. 8 is a structural schematic view of an outer sleeve of an endoscope adapter in an embodiment of the present disclosure.

As shown in FIG. 8, the outer sleeve 12 of the endoscope adapter 10 can include an outer sleeve body 121 and a separator 122 between the outer sleeve body 121 and the inner sleeve 11. The outer channel 120 can be located in the separator 122 and extend through the separator 122, and the separator 122 can be configured to limit the inner sleeve 11 and the outer channel 120. In other words, an internal space of the outer sleeve body 121 can be isolated into two parts with fixed positions via the separator 122, that is, the outer channel 120 and a fitting hole 123 being sleeved on the inner sleeve 11.

An embodiment of a peripheral cross-section of the outer sleeve body 121 is shown in FIG. 6. It could be understood that the peripheral cross-section of the outer sleeve body 121 is not specifically limited in the present disclosure, as long as the distal end of the insertion portion of the endoscope and the robot arm assembly 20 can be simultaneously pushed and drew at the same time, and a minimum cross-section can be obtained. Therefore, the peripheral cross-section of the outer sleeve body 121 can also be in different shapes the peripheral cross-section of the outer sleeve body 121 can also be in different shapes, which can be formed by a small circle being tangent to or connected with a large circle. Moreover, an outer peripheral surface of the outer sleeve body 121 can be smooth and free of corner angles to avoid damage the cavity tract during insertion into the human cavity tract. According to the above technical solution, the outer sleeve body 121 can include a first head 1211 and a second head 1212. A size of the first head 1211 is smaller than that of the second head 1212.

The outer channel 120 and the fitting hole 123 can be defined in the inner cavity of the outer sleeve body 121 via the separator 122. As shown in FIG. 6, the outer channel 120 can be located in the first head 1211 of the outer sleeve body 121, the fitting hole 123 can be located in the second head 1212 of the outer sleeve body 121, and a diameter of the fitting hole 123 can be larger than that of the outer channel 120. The inner sleeve 11 matched with the fitting hole 123 can include the inner channel 110, so that the inner channel 110 can be correspondingly matched with the distal end of the insertion portion of the endoscope with a larger diameter and the outer channel 120 can be correspondingly matched with and the sheath 40 having a sheath lumen with a smaller diameter, respectively.

In an embodiment, the separator 122 can be integrally formed on an inner sidewall of the outer sleeve body 121, that is, the outer sleeve 12 can be integrally formed. Furthermore, although the outer sleeve 12 includes two separated separators 122 in some embodiments of the present disclosure, it is understood that the separator 122 can also be an integral unit with only a notch in the middle thereon to serve as outer channel 120.

Figure 9:
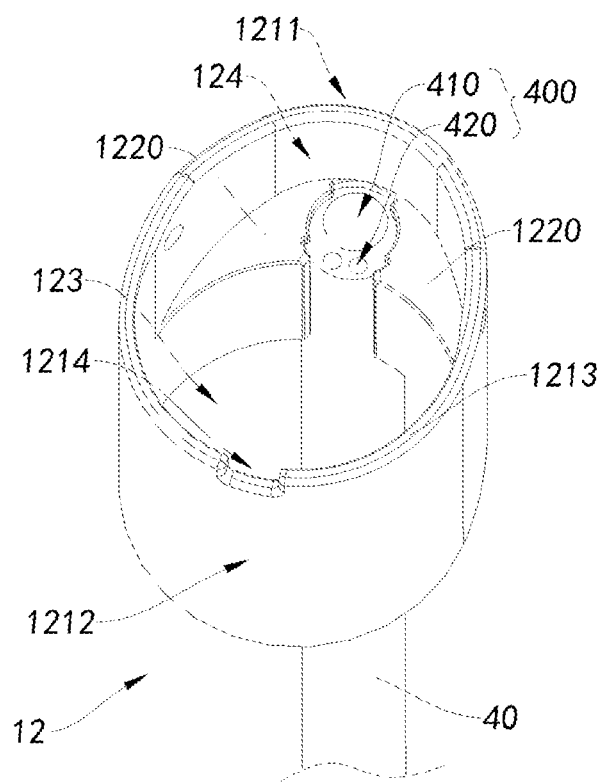
FIG. 9 is a stereoscopic structural schematic view of a connection between an endoscope adapter (an inner sleeve is not shown herein) and a sheath in an embodiment of the present disclosure.

Referring to FIG. 8 and FIG. 9, an upper surface 1220 of the separator 122 can be recessed downward to a distal end surface 1213 of the outer sleeve body 121, so as to form an accommodating slot 124 at the distal end of the outer sleeve body 121 for accommodating the end effector 22, thus avoiding damage to human organs due to exposition of the end effector 22 during the surgical operation.

The inner sleeve 11 of the endoscope adapter 10 can include an inner sleeve body 111 including an inner channel 110. The inner sleeve 11 can be made of a flexible material (e.g., flexible polyvinyl chloride, polyurethane, and silicone), and an inner diameter of the inner sleeve 11 can be smaller than an outer diameter of the distal end of the insertion portion of the endoscope, such that the inner sleeve 11 can be tightly matched with the distal end of the insertion portion of the endoscope. Specifically, the inner diameter of the inner sleeve 11 can be about 0.2 mm smaller than the outer diameter of the distal end of the insertion portion of the endoscope, so as to obtain a more suitable matching relationship. At the same time, the flexible inner sleeve 11 can be prolong a service life of the endoscope.

Figure 7:
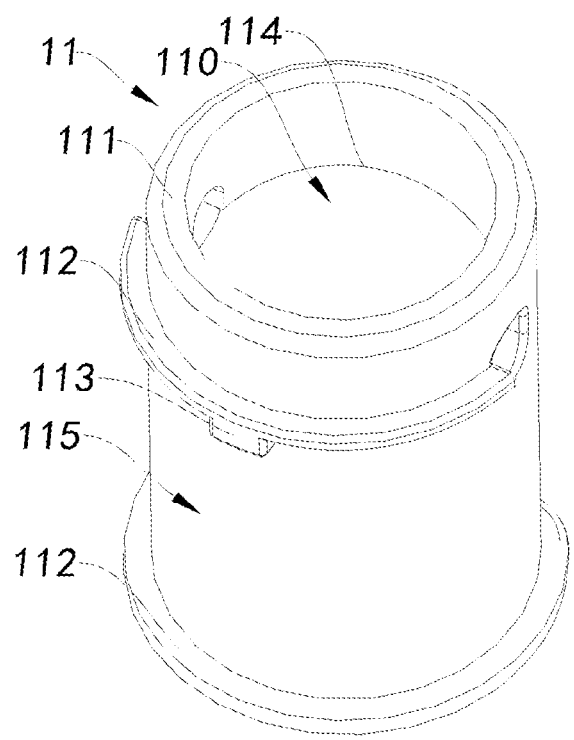
FIG. 7 is a structural schematic view of an inner sleeve of an endoscope adapter in an embodiment of the present disclosure.

Referring to FIG. 7, an outer sidewall of the inner sleeve body 111 extending outwards can be defined as a pair of first limiting members 112. When the outer sleeve 12 is sleeved on the inner sleeve body 111, the pair of first limiting members 112 is capable of limiting two axial ends of the outer sleeve 12. In other words, the two first limiting members 112 can define a limiting groove 115 on the outer sidewall of the inner sleeve body 111 for embedding the outer sleeve body 121 of the outer sleeve 12, so as to prevent the outer sleeve 12 from sliding relative to the inner sleeve 11 along an axis thereof.

The outer sidewall of the inner sleeve body 111 extending outwards is defined as at least one second limiting member 113. The second limiting member 113 can be independently provided or integrally connected to the first limiting member 112. In FIG. 7, the second limiting member 113 extends from one first limiting member 112 to another first limiting member 112. Correspondingly, the outer sleeve 12 can be provided with a groove 1214 matching with the second limiting member 113. When the outer sleeve 12 is sleeved on the inner sleeve body 111, the second limiting member 113 can be inserted in the groove 1214 of the outer sleeve body 121, thus preventing the outer sleeve 12 from rotating relative to the inner sleeve 11 along a circumference of the outer sleeve 12.

An inner sidewall of the inner sleeve body 111 can extend and form a limiting ring 114, which can be configured for preventing the distal end of the insertion portion of the endoscope from penetrating through the inner sleeve 11, so as to ensure a stable and reliable connection position between the inner sleeve 11 and the distal end of the insertion portion of the endoscope.

Figure 11:
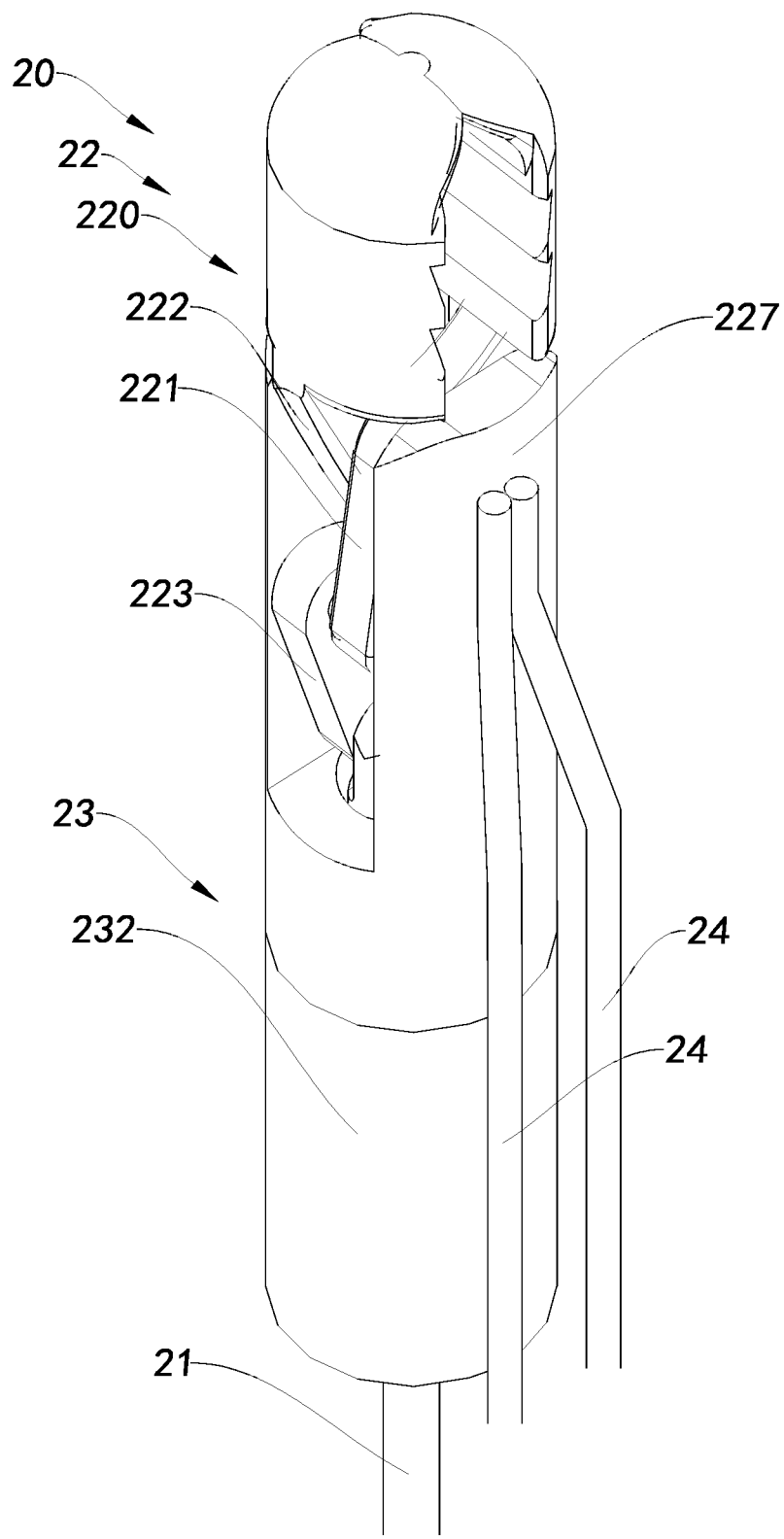
FIG. 11 is a structural schematic view of a distal end of a robot arm assembly in an embodiment of the present disclosure.

Referring to FIG. 1 and FIG. 11, the present disclosure provides an auxiliary instrument for endoscopic surgery 1, including the endoscope adapter 10, a robot arm assembly 20, a manipulator 30 and a sheath 40 having a sheath lumen. In the auxiliary instrument for endoscopic surgery 1, a structure of the endoscope adapter 10 has been described above.

Figure 15:
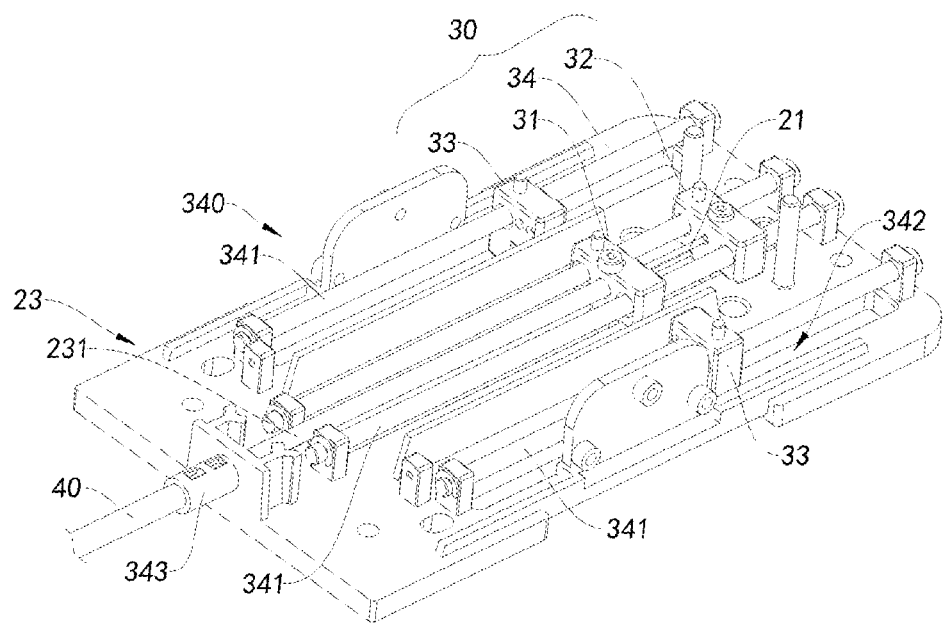
FIG. 15 is a structural schematic view of an internal structure of a manipulator in an embodiment of the present disclosure.

The sheath 40 is configured to form a communicating channel 400 between the outer channel 120 of the endoscope adapter 10 and the manipulator 30. In an embodiment, as shown in FIG. 4 and FIG. 8, the outer sleeve body 121 can include a transverse hole 1210 communicating the outer channel 120 with the outside. A distal end of the sheath 40 can be fixed within the outer channel 120 of the outer sleeve 12 by painting a medical binder in the transverse hole 1210. As shown in FIG. 15, a chassis 34 can be provided with a connecting tube 343, the connecting tube 343 can be sleeved on and fixed to a proximal end of the sheath 40.

Figure 2:
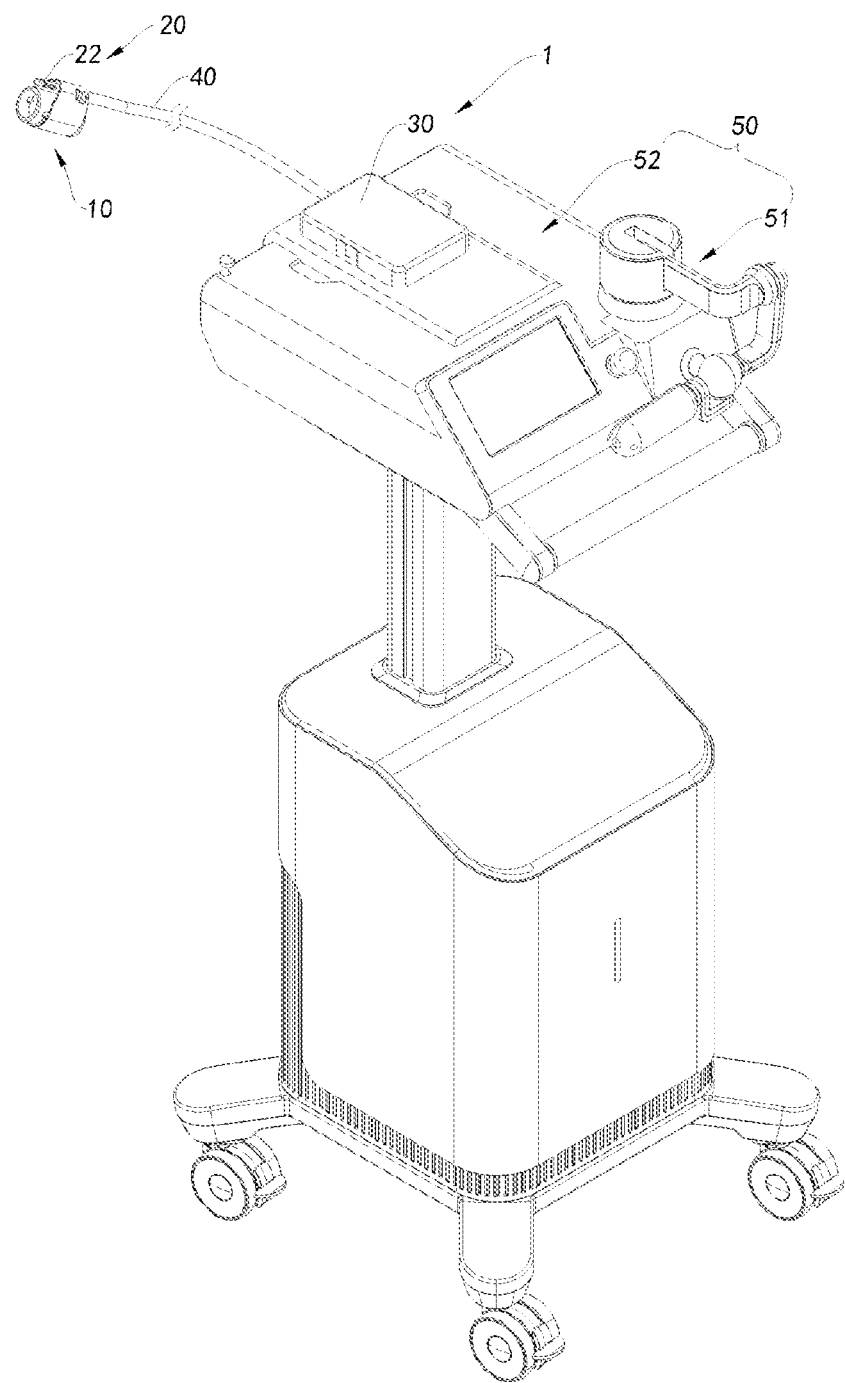
FIG. 2 is a schematic view of an auxiliary instrument for endoscopic surgery applied in a robot arm cart in an embodiment of the present disclosure.
Figure 3:
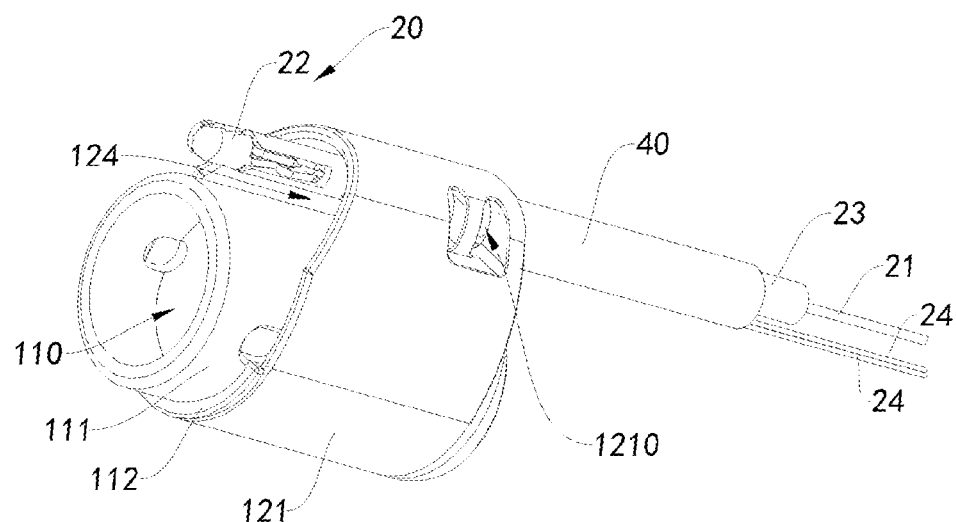
FIG. 3 is a structural schematic view of a distal end of an auxiliary instrument for endoscopic surgery in an embodiment of the present disclosure.
Figure 12:
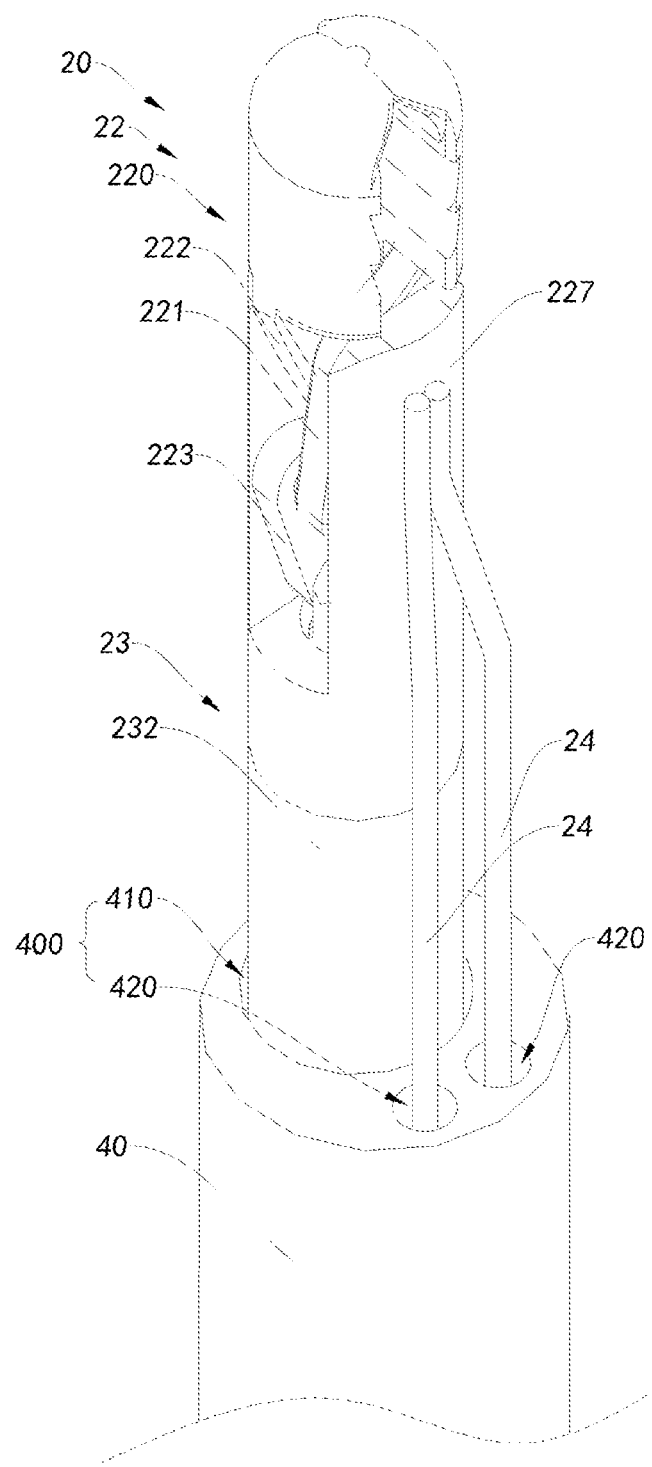
FIG. 12 is a structural schematic view of a connection between a robot arm assembly (at the distal end) and a sheath in an embodiment of the present disclosure.

Referring to FIG. 2, FIG. 11 and FIG. 12, the robot arm component 20 can include a first actuation wire 21, the end effector 22, an elastic tube 23 and at least two second actuation wires 24. The elastic tube 23 can slidably extend through the sheath lumen, a distal end of the elastic tube 23 can extend out from the sheath lumen, and a proximal end of the elastic tube 23 can be manipulatively connected to the manipulator 30. Under a control of the manipulator 30, the elastic tube 23 can be pushed and pulled along a third channel 410, so as to drive the robot arm assembly 20 to be pushed and drew as a whole. The second actuation wire 24 can be configured to be penetrated in the sheath 40 having a sheath lumen and disposed outside the elastic tube 23. A distal end of the second actuation wire 24 can be fixed to the distal end of the elastic tube 23, a proximal end of the second actuation wire 24 can be manipulatively connected to the manipulator 30, so as to drive the distal end of the elastic tube 23 to deflect towards an axis of the inner sleeve 11 of the endoscope adaptor 10. In this way, operators can control the end effector 22 to reach the desired positions via the manipulator 30.

The first actuation wire 21 can be configured to be penetrated through the elastic tube 23, a distal end of the first actuation wire 21 can be fixed to the end effector 22, and a proximal end of the first actuation wire 21 can be manipulatively connected to the manipulator 30, thereby controlling operation of the end effector 22 under the control of the manipulator 30.

The sheath 40 can include a multi-lumen tube, as shown in FIG. 9 and FIG. 12, the communicating channel 400 of the sheath 40 can include a third channel 410 and two independent fourth channels 420. The elastic tube 23 can penetrate through the third channel 410, and the two second actuation wires 24 can penetrate through the two fourth channels 420 of the sheath 40 having a sheath lumen, respectively. Therefore, the elastic tube 23 and the two second actuation wires 24 can be driven separately without affecting each other during use.

In some embodiments, the number of the at least two fourth channels 420 can be the same with that of the at least two second actuation wires 24.

Figure 10:
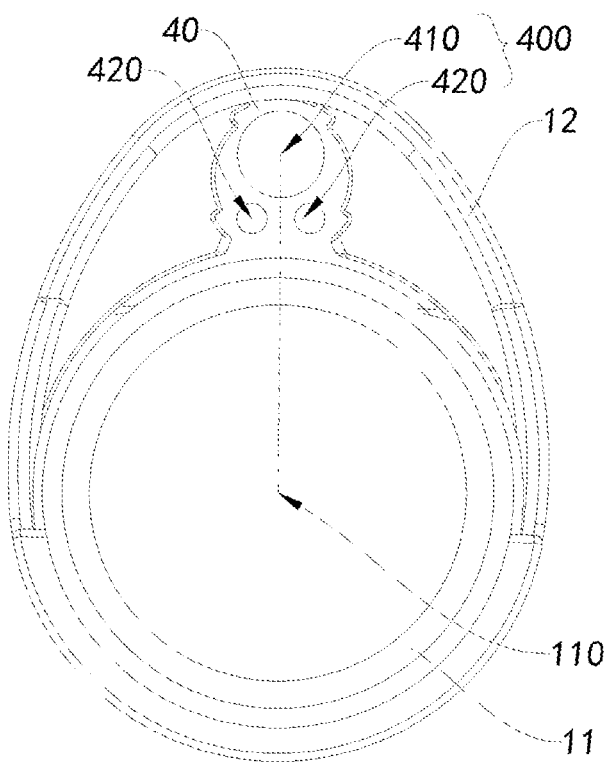
FIG. 10 is a top view of a connection between an endoscope adapter and a sheath in an embodiment of the present disclosure.

As shown in FIG. 10, the fourth channel 420 can be located in an area between an axis of the third channel 410 of sheath 40 and an axis of the inner channel 110 of inner sleeve 11. When the second actuation wire 24 is pulled, the distal end of the elastic tube 23 can deflect towards an axis of the inner sleeve 11. Thus, the end effector 22 can be tilted to the distal end of an insertion portion of the endoscope sleeved on the inner channel 110, and the end effector 22 can be always in a surgical field of the endoscope.

As shown in FIG. 9 and FIG. 12, the two fourth channels 420 can be disposed side by side on the same side of the third channel 410, i.e., lower left and lower right sides of the third channel 410 in FIG. 9 and FIG. 12. Thus, a bendable pipe section 232 of the elastic tube 23 can be controlled by two second actuation wire 24 to bend directly below, bottom left or bottom right. It could be understood that when the second actuation wire 24 at the lower left side is independently drawn, the bendable pipe section 232 of the elastic tube 23 can bend towards the lower left in the figures; when the second actuation wire 24 on the lower right side is independently drawn, the bendable pipe section 232 of the elastic tube 23 can bend towards the lower right of the figures; and when the two second actuation wires 24 are drawn at the same time, the bendable pipe section 232 of elastic tube 23 can bend to directly below of the figures. In addition, when the two second actuation wires 24 are relaxed, the bendable pipe section 232 of elastic tube 23 will return to a straightened state.

Figure 13:
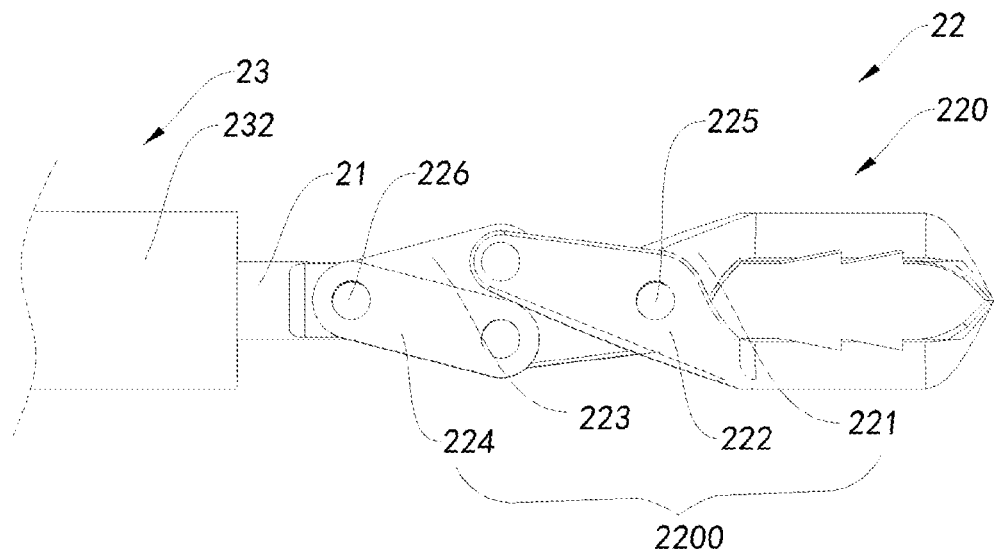
FIG. 13 is a schematic view of an end effector in an embodiment of the present disclosure, and the end effector is a clamp.
Figure 14:
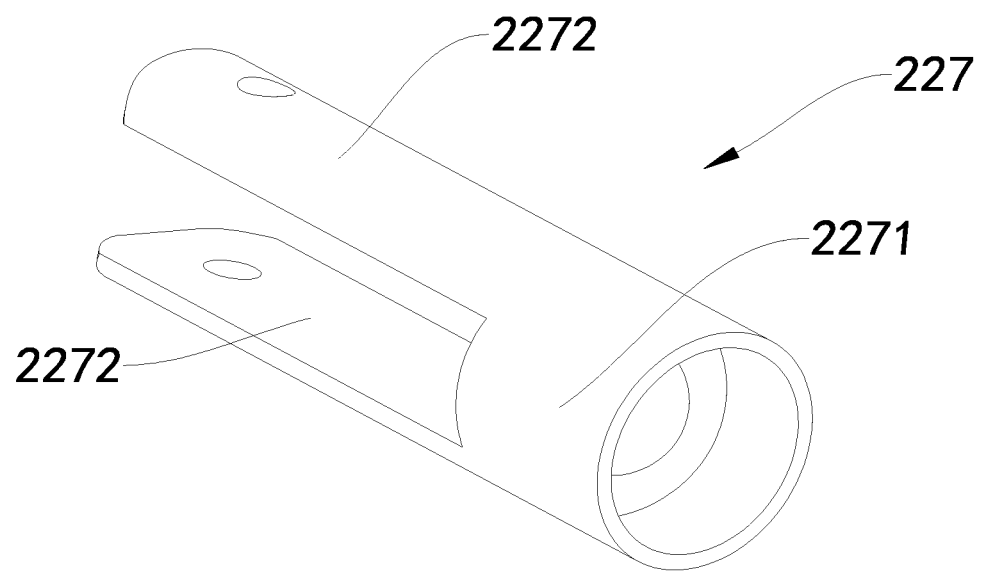
FIG. 14 is a stereoscopic view of a connecting seat of the end effector in an embodiment of the present disclosure.

The end effector 22 can be surgical tools such as scissors, needles, hooks, or clips. In an embodiment, as shown in FIG. 13 and FIG. 14, the end effector 22 can include a four-bar linkage, a first linkage 221 of the four-bar linkage can be connected to a second linkage 222 of the four-bar linkage via a first pivot pin 225, and a third linkage 223 of the four-bar linkage can be connected to a fourth linkage 224 of the four-bar linkage via a second pivot pin 226. The distal end of the first actuation wire 21 can be connected to the second pivot pin 226, the distal end of the elastic tube 23 can be connected to the first pivot pin 225 via a connecting seat 227, and the first rotating rod 221 and the second rotating rod 222 are capable of extending to define a clamp 220, respectively. It could be understood that pushing and drawing the first actuation wire 21 can control opening and closing of the clamp 220.

As shown in FIG. 14, the connecting seat 227 can include a sleeve tube 2271 and a pair of pivot arms 2272 extending from an end of the sleeve tube 2271. The sleeve tube 2271 can be sleeved and welded on the distal end of the elastic tube 23, the distal end of the second actuation wire 24 can be directly fixed to one of the pair of pivot arms 2272 of the connecting seat 227, and two ends of the first pivot pin 225 can be connected to the pair of pivot arms 2272, respectively.

As shown in FIG. 15, the manipulator 30 can include a first sliding block 31 connected to the proximal end of the elastic tube 23, a second sliding block 32 connected to the proximal end of the first actuation wire 21, a third sliding block 23 connected to the proximal end of the second actuation wire 24 and a chassis 34 provided with guide rails 340. The first sliding block 31, the second sliding block 32 and the third sliding block 33 are capable of being driven and sliding along a corresponding guide rail 340 disposed on the chassis 34, respectively, so as to drive the elastic tube 23, the first actuation wire 21 and the second actuation wire 24, respectively. In order to show an internal structure of the manipulator 30, a housing of manipulator 30 shown in FIG. 1 and FIG. 2 is not shown in FIG. 15.

The guide rail 340 of the chassis 34 can include a guide rod 341 and a guide slot 342 configured for guiding the first sliding block 31, the second sliding block 32 and the third sliding block 33, so that the first sliding block 31, the second sliding block 32 and third sliding block 33 can slide directionally along a corresponding guide rod 341 and guide slot 342.

Figure 16:
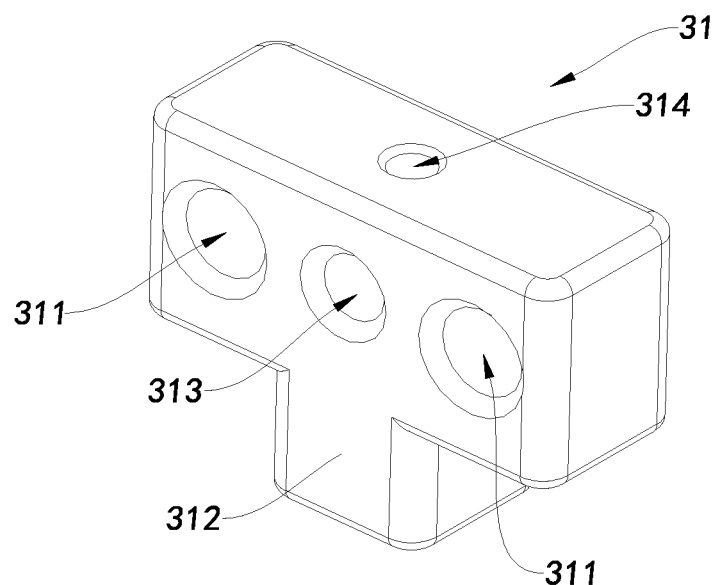
FIG. 16 is a stereoscopic view of a first sliding block of the manipulator in an embodiment of the present disclosure.

As shown in FIG. 16, the first sliding block 31 can be provided with a pair of first through holes 311 matched with the guide rod 341, a first protrusion 312 matched with the guide slot 342, a first channel 313 for the elastic tube 23 to penetrate through and a first fastening hole 314 that communicates with the first channel 313. In this way, the first through hole 311 on the first sliding block 31 can be configured for allowing the guide rod 341 to penetrate through, and the first protrusion 312 on the first sliding block 31 can slide inside the guide slot 342, so that the first sliding block 31 can slide steadily directionally on the chassis 34. At the same time, the elastic tube 23 penetrating through the first channel 313 can be bolted through the first fastening hole 314 with the first sliding block 31, so that the elastic tube 23 can be pushed and pulled by the first sliding block 31.

Figure 17:
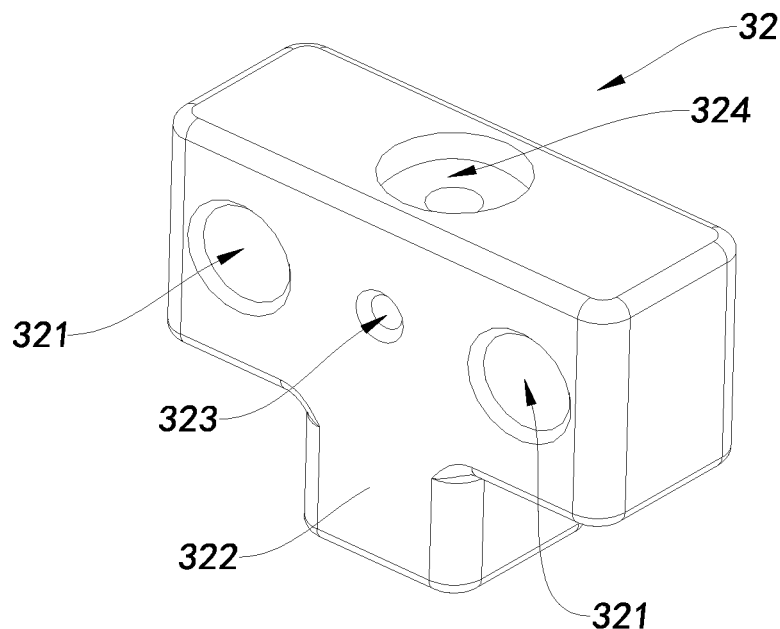
FIG. 17 is a stereoscopic view of a second sliding block of the manipulator in an embodiment of the present disclosure.

As shown in FIG. 17, the second sliding block 32 can be provided with a pair of second through holes 321 matched with the guide rod 341, a second protrusion 322 matched with the guide slot 342, a second channel 323 for allowing the first actuation wire 21 to penetrate through and a second fastening hole 324 that communicates with the second channel 323. In this way, the second through hole 321 on the second sliding block 32 can be configured for allowing the guide rod 341 to penetrate through, and the second protrusion 322 on the second sliding block 32 can slide inside the guide slot 342, so that the second sliding block 32 can slide steadily directionally on the chassis 34. At the same time, the first actuation wire 21 penetrating through the second channel 323 can be bolted through the second fastening hole 324 with the second sliding block 32, so that the elastic tube 23 can be pushed and pulled by the first actuation wire 21. In some embodiments, the first actuation wire 21 can be made of stiff wire material.

Figure 18:
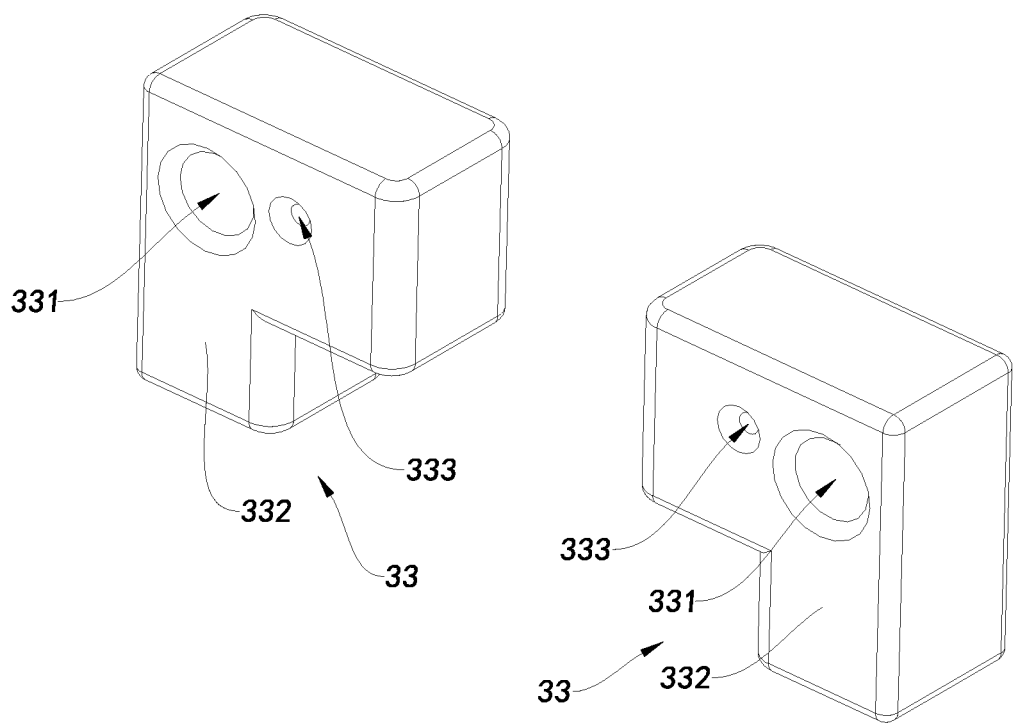
FIG. 18 is a stereoscopic view of a third sliding block of the manipulator in an embodiment of the present disclosure.

As shown in FIG. 18, the third sliding block 33 can be provided with a pair of third through holes 331 matched with the guide rod 341, a third protrusion 332 matched with the guide slot 342 and a fixing hole 333 configured for fixing the second actuation wire 24. In this way, the third through hole 331 on the third sliding block 33 can be configured for allowing the guide rod 341 to penetrate through, and the third protrusion 332 on the third sliding block 33 can slide inside the guide slot 342, so that the third sliding block 33 can slide steadily directionally on the chassis 34. At the same time, the third sliding block 33 is able to fix the second actuation wire 24 by the fixing hole 333, so that the second actuation wire 24 can be pulled by the third sliding block 33. In some embodiments, the second actuation wire 24 can be made of flexible wire material.

The elastic tube 23 can be a spiral tube made of tightly wound stainless steel. The elastic tube 23 can include a hard pipe section 231 and a bendable pipe section 232, and the hard pipe section 231 can be configured to be fixed to the first sliding block 31.

The auxiliary instrument for endoscopic surgery 1 provided by the present disclosure can be applied on surgical robots employing a master-slave control mode. As shown in FIG. 2, the manipulator 30 of the auxiliary instrument for endoscopic surgery 1 can be loaded on the robot arm cart 50, and the robot arm cart 50 can be provided with a master manipulator 51 and a driving device 52. The master manipulator 51 can include, but is not limited to, serial isomeric robot arm, serial heterogeneous robot arm, parallel robot arm, exoskeleton gloves, etc. The master manipulator 51 in FIG. 2 can include an arm portion having three rotating joints and a wrist portion having three rotating joints, an end of the wrist portion (that is, the handle) can be provided with an opening and closing button, and each of the three rotating joints of the arm portion can be provided with a sensor. By operating the handle or the button of the master manipulator 51 by the operator, corresponding information can be transmitted to a controller. The controller can calculate the received information and passes thereof to the driving device 52 as an action instruction.

The driving device 52 can include a driver and a motor controlled by the driver, respectively. When the driver receives the action instruction from the controller, the driver can control a corresponding motor to operate or stop.

Figure 19:
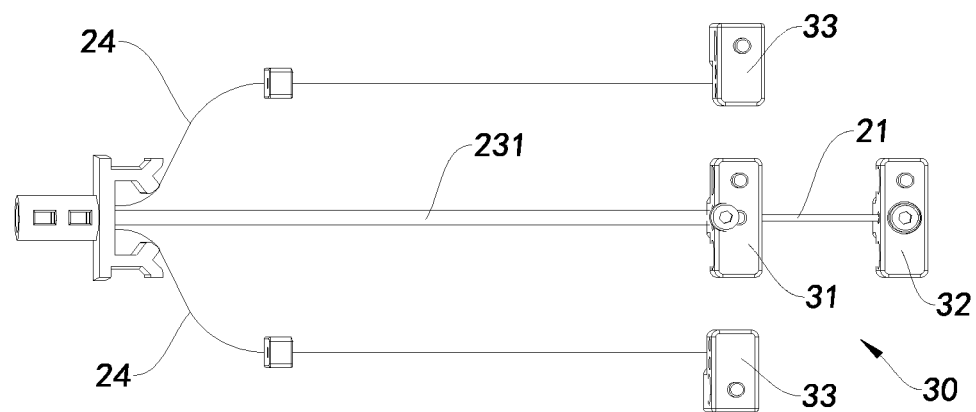
FIG. 19 is a schematic view of an actuation principle of the manipulator in an embodiment of the present disclosure.

Referring to FIG. 19, the driving device 52 can include four linear motors (not shown), which can be configured for driving the first sliding block 31, the second sliding block 32 and the two third sliding blocks 33 to slide respectively. Bottoms of the first sliding block 31, the second sliding block 32 and third sliding block 33 can be provided with a groove, a hole, or a shaft connected to an output shaft of the motor, respectively, so as to be drivably connected to the output shaft of the motor.

Figure 20:
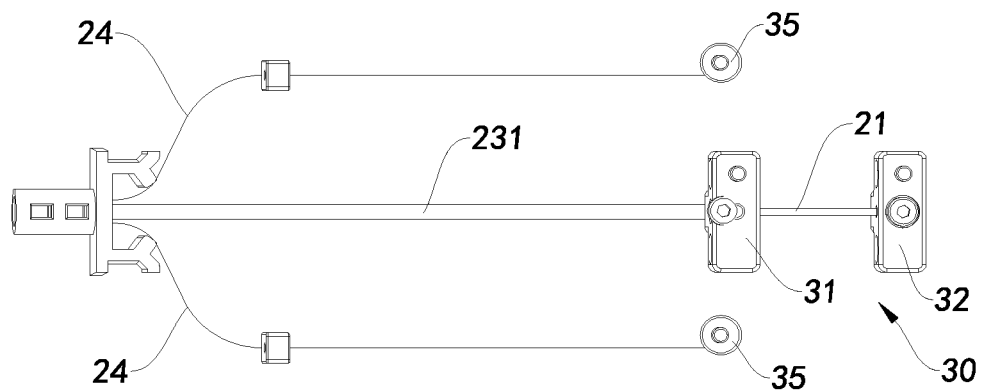
FIG. 20 is a schematic view of an actuation principle of a manipulator in an embodiment of the present disclosure.
Figure 21:
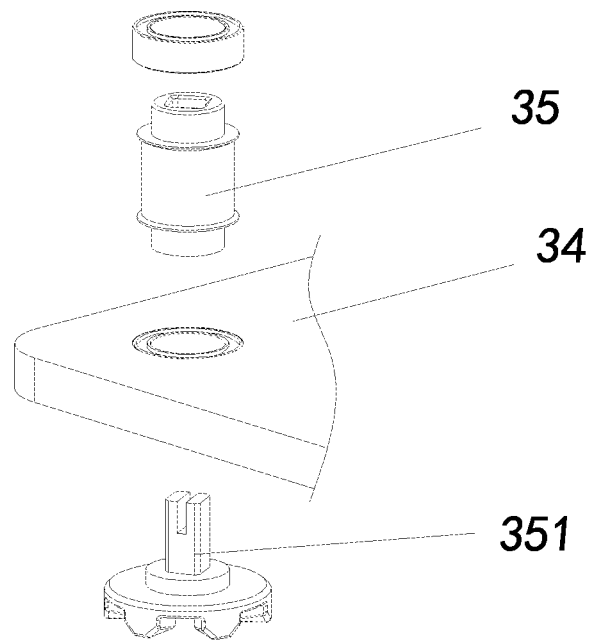
FIG. 21 is an exploded view of a capstan, chassis and an axle.

FIG. 20 is an alternative embodiment of FIG. 19, in which two capstans 35 can replace the two third sliding blocks 33. Further referring to FIG. 21, the proximal end of the second actuation wire 24 of the robot arm assembly 20 can be connected to the capstan 35, and the capstan 35 can be connected to the chassis 34 via an axle 351, and the capstan 35 can be driven to rotate about the axle 351. It could be understood that the capstan 35 can be drivably connected to the output shaft of the motor, so that the second actuation wire 24 can control the distal end of the robot arm assembly 20 to deflect by means of winding.

In some embodiments, the capstans 35 on the axles 351 may be simple cylindrical capstans with circular cross-sections around which the second actuation wire 24 wraps. When physically connected or coupled, the axles 351 may share axes of rotation with the drive outputs in the driving device 52 to allow the transfer of torque.

Taking gastric ESD as an example, a surgical procedure can usually include several steps such as labeling diseased tissue, submucosal injection, edge incision and dissection. After labeling diseased tissues, submucosal injection and edge incision, the auxiliary instrument for endoscopic surgery 1 of the present disclosure can be used for assisted dissection.

Firstly, the manipulator 30 can be embedded in a mounting slot on the robot arm cart 50. Since a bottom of the sliding block (or the capstan) of the manipulator 30 can be provided with the groove, and the mounting slot on the robot arm cart 50 can be provided with a protrusion matched with the mounting slot and connected to the motor. When the groove is connected to the corresponding protrusion, the manipulator 30 can be ensured to be effectively connected to the driving device 52.

Figure 22:
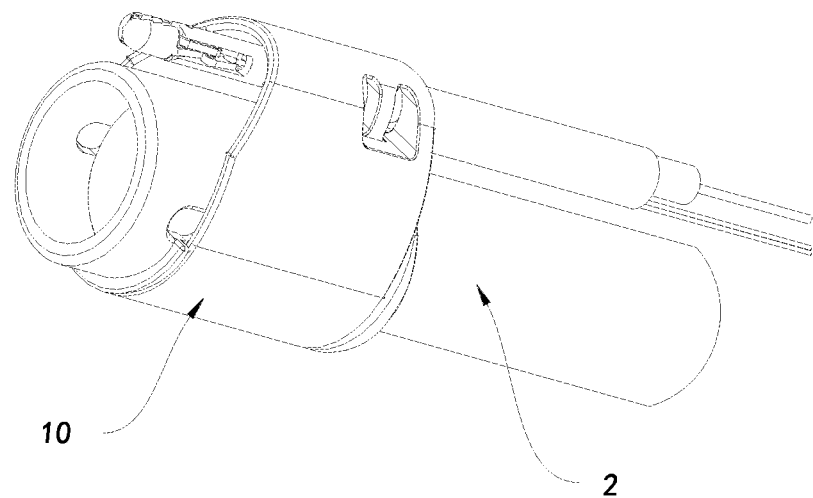
FIG. 22 is a schematic view of a relationship between an endoscope adapter and an endoscope.

Referring to FIG. 22, the endoscope adapter 10 can be connected to the distal end of the insertion portion of the endoscope via the inner sleeve 11, such that a distal end of the auxiliary instrument for endoscopic surgery 1, along with the insertion portion of the endoscope, can be introduced to the diseased tissue of a stomach via an oral cavity of a patient.

During a dissection step, the endoscope and the master manipulator on the robot arm cart can be operated separately by two operators in cooperation with each other. The operator can hold the handle of the master manipulator 51, and operate the handle of the master manipulator 51 with an observation image obtained by the endoscope, so as to push and draw the elastic tube 23, as well as pull the second actuation wire 24 to ensure that the end effector 22 can reach the desired position. The operator can press the opening and closing button on the handle to control the opening and closing of the clamp, so that the clamp can be used to grasp the diseased tissue. Then the handle of master manipulator 51 can be controlled to pull up the mucosas, to expose the submucosal tissues. At the same time, an ESD dissection operation can be performed with an electroscalpel that passes through an endoscopic working channel.

The auxiliary instrument for endoscopic surgery 1 of the present disclosure can provide a suitable strengths and directions of mucosal traction during the ESD dissection operation, so as to ensure that the diseased tissue can be completely peeled off. The auxiliary instrument for endoscopic surgery 1 can greatly improve accuracy and stability of an ESD surgical operation, and reduce difficulty of operation and shorten operation time.

The present disclosure provides an endoscope adapter matched with a flexible endoscope, which can provide an outer channel for the flexible endoscope. The present disclosure further provides the auxiliary instrument for endoscopic surgery, which can provide assistance for endoscopic surgery, help to improve accuracy and stability of a surgical operation, and reduce difficulty and shorten operation time thereof.

I claim:

1. An endoscope adapter, comprising,
an inner sleeve comprising an inner channel configured for accommodating a distal end of an insertion portion of the endoscope; and
an outer sleeve, which is sleeved on the inner sleeve, wherein an outer channel is defined between the outer sleeve and the inner sleeve, and the outer channel is configured for accommodating and providing a space for allowing a robot arm assembly having an end effector to advance and retract,
wherein the outer sleeve comprises an outer sleeve body and a separator extending inwards from an inner sidewall of the outer sleeve to the inner sleeve, the outer channel is located in the separator and extends through the separator, and the separator is configured to limit the inner sleeve and the outer channel.

2. The endoscope adapter of claim 1, wherein an upper surface of the separator recesses downwards from an end surface of the outer sleeve body.

3. The endoscope adapter of claim 1, wherein the inner sleeve is made of a flexible material, and an inner diameter of the inner sleeve is slightly smaller than an outer diameter of the distal end of the insertion portion of the endoscope.

4. The endoscope adapter of claim 1, wherein the inner sleeve comprises an inner sleeve body comprising the inner channel, an outer sidewall of the inner sleeve body comprises a pair of first limiting members extending outwards therefrom, when the outer sleeve is sleeved on the inner sleeve body, the pair of first limiting members is capable of limiting two axial ends of the outer sleeve.

5. The endoscope adapter of claim 1, wherein the inner sleeve comprises an inner sleeve body comprising the inner channel, an outer sidewall of the inner sleeve body comprises at least one second limiting member extending outwards therefrom, the outer sleeve is provided with a groove matching with the second limiting member, and when the outer sleeve is sleeved on the inner sleeve body, the second limiting member is inserted in the groove.

6. The endoscope adapter of claim 1, wherein the inner sleeve comprises an inner sleeve body comprising the inner channel, an inner sidewall of the inner sleeve body comprises a limiting ring protruding inwards therefrom, which is configured for preventing the distal end of the insertion portion of the endoscope from penetrating through the inner sleeve.

7. An auxiliary instrument for endoscopic surgery, comprising, the endoscope adapter of claim 1, configured to be connected with the distal end of the insertion portion of the endoscope,
a manipulator;
a sheath having a sheath lumen configured to form a communicating channel between the outer channel of the endoscope adapter and the manipulator; and
a robot arm component, which comprises the end effector, an elastic tube, a first actuation wire and at least two second actuation wires,
wherein the elastic tube extends through the communicating channel, a distal end of the elastic tube extends out from the sheath lumen, and a proximal end of the elastic tube is manipulatively connected to the manipulator; the first actuation wire is configured to penetrate through the elastic tube, a distal end of the first actuation wire is connected to the end effector, and a proximal end of the first actuation wire is manipulatively connected to the manipulator; the at least two second actuation wires are configured to penetrate through the sheath lumen and disposed outside the elastic tube, a distal end of the second actuation wire is connected to the distal end of the elastic tube, a proximal end of the second actuation wire is manipulatively connected to the manipulator, and is configured to drive the distal end of the elastic tube to deflect towards an axis of the inner sleeve of the endoscope adaptor.

8. The auxiliary instrument for endoscopic surgery of claim 7, wherein the communicating channel of the sheathing tube comprises a third channel and at least two fourth channels, the third channel is configured for allowing the elastic tube to penetrate through, the at least two fourth channels are configured for allowing the second actuation wire to penetrate through, and the number of the at least two fourth channels are the same with that of the at least two second actuation wires.

9. The auxiliary instrument for endoscopic surgery of claim 7, wherein the manipulator comprises a first sliding block connected to the proximal end of the elastic tube, a second sliding block connected to the proximal end of the first actuation wire, a third sliding block connected to the proximal end of the second actuation wire and a chassis provided with guide rails, and the first sliding block, the second sliding block and the third sliding block are capable of being driven to slide along a corresponding guide rail disposed on the chassis, respectively.

10. The auxiliary instrument for endoscopic surgery of claim 7, wherein the manipulator comprises a first sliding block connected to the proximal end of the elastic tube, a second sliding block connected to the proximal end of the first actuation wire, a capstan connected to the proximal end of the second actuation wire and a chassis provided with guide rails, the first sliding block and the second sliding block are capable of being driven and sliding along a corresponding guide rail disposed on the chassis, respectively; the capstan is mounted to the chassis via an axle, and the capstan is capable of being driven to rotate around the axle.

11. The auxiliary instrument for endoscopic surgery of claim 7, wherein the end effector comprises a four-bar linkage, a first linkage of the four-bar linkage is connected to a second linkage of the four-bar linkage via a first pivot pin, a third linkage of the four-bar linkage is connected to a fourth linkage of the four-bar linkage via a second pivot pin, the distal end of the first actuation wire is connected to the second pivot pin, the distal end of the elastic tube is connected to the first pivot pin via a connecting seat, and both an end of the first linkage and an end of the second linkage are capable of extending to form a clamp.

* * * * *